(12) United States Patent
Orii (10) Patent No.: US 8,210,438 B2
(45) Date of Patent: Jul. 3, 2012

(54) MEDIUM PROCESSING DEVICE AND METHOD OF CONTROLLING THE SAME

(75) Inventor: Tsutomu Orii, Nagano (JP)

(73) Assignee: Nidec Sankyo Corporation (JP)

(*) Notice: Subject to any disclaimer, the term of this patent is extended or adjusted under 35 U.S.C. 154(b) by 261 days.

(21) Appl. No.: 12/527,272

(22) PCT Filed: Feb. 15, 2008

(86) PCT No.: PCT/JP2008/000241
§ 371 (c)(1),
(2), (4) Date: Oct. 29, 2009

(87) PCT Pub. No.: WO2008/099619
PCT Pub. Date: Aug. 21, 2008

(65) Prior Publication Data
US 2010/0038429 A1    Feb. 18, 2010

(30) Foreign Application Priority Data
Feb. 16, 2007    (JP) .................. 2007-035890

(51) Int. Cl.
G06K 13/06    (2006.01)
G06K 13/24    (2006.01)

(52) U.S. Cl. ................ 235/483; 235/380; 235/492

(58) Field of Classification Search .............. 235/483, 235/375, 380, 492, 451
See application file for complete search history.

(56) References Cited

U.S. PATENT DOCUMENTS

| 5,016,833 A | 5/1991 | Hamlin |
| 5,196,687 A | 3/1993 | Sugino et al. |
| 5,951,473 A * | 9/1999 | Sherry et al. .................. 600/420 |
| 6,491,226 B1 * | 12/2002 | Nishioka ....................... 235/475 |
| 2002/0115350 A1 * | 8/2002 | Nishio et al. .................. 439/630 |

FOREIGN PATENT DOCUMENTS

| EP | 0363992 A2 | 4/1990 |
| EP | 0453091 A1 | 10/1991 |
| JP | 1-233680 A | 9/1989 |
| JP | 2-126385 A | 5/1990 |
| JP | 2-126386 A | 5/1990 |
| JP | 4-213548 A | 8/1992 |
| JP | 2004-206176 A | 7/2004 |
| JP | 2005-70870 A | 3/2005 |

OTHER PUBLICATIONS

International Search Report for International Application No. PCT/JP2008/000241 mailed May 13, 2008 with English Translation.

* cited by examiner

Primary Examiner — Edwyn Labaze
(74) Attorney, Agent, or Firm — Cantor Colburn LLP (57) ABSTRACT

A card reader has a contact mechanism (IC contact block) coming into contact with a terminal (IC terminal pattern) of an integrated circuit mounted on a card, detection means (detection switch) for detecting that the card is inserted to a contact position at which the terminal and the contact mechanism are in contact with each other, locking means (locking lever etc.) for fixing the card to the contact position, and control means (CPU etc.) for controlling execution and release of locking by the locking means. As soon as the detection means detects insertion of the card, the control means executes locking effected by the locking means and after that, when the card is not activated in response to activation processing by the integrated circuit, release the locking of the locking means.

12 Claims, 4 Drawing Sheets

MEDIUM PROCESSING DEVICE AND METHOD OF CONTROLLING THE SAME

This is a U.S. national stage of application No. PCT/JP2008/000241, filed on 15 Feb. 2008. Priority under 35 U.S.C. §119(a) and 35 U.S.C. §365(b) is claimed from Japanese Application No. 2007-035890, filed 16 Feb. 2007, the disclosure of which is also incorporated herein by reference.

FIELD OF THE INVENTION

The present invention relates to a medium processing device and a method of controlling the same for reading/writing information from/to a card-like medium such as a banking card and a credit card.

BACKGROUND

As cards to be used in financial institutions and other facilities for the purpose of realization of cashless service and personal authentication, conventionally there is a magnetic card in which a magnetic stripe is formed on a plastic substrate surface, and an IC card in which an integrated-circuit chip (IC chip) is embedded in a plastic substrate and an IC terminal is placed on a plastic substrate surface. Then, reading and reproducing information from/to these magnetic card and IC card is carried out by a card reader equipped with a magnetic head and/or an IC contact.

The card reader reads magnetic information saved in the magnetic card and writes new magnetic information into the magnetic card through making the magnetic head come into contact with, and slide on the magnetic stripe on the magnetic card surface. Also, the card reader reads electronic information saved in the IC card and writes new electronic information into the IC card through making the IC contact come into contact with the metal terminal (IC terminal) on the IC card surface.

On this occasion, if the IC card is pulled out intentionally or accidentally in the course of reading/writing electronic information, the IC communication gets interrupted. Techniques to avoid such interruption are as described below (Refer to Patent Documents 1 through 3).

In the case of a magnetic card reader disclosed in Patent Document 1; as soon as an IC card is inserted, magnetic detection is carried out by a magnetic head. If no magnetism is detected, it is judged that the card is an IC card and then the card is locked. In the case of IC card processing devices disclosed in Patent Document 2 and Patent Document 3, it is detected by using a metal sensor such as a hole element whether an IC card has been inserted or not (The metal sensor responds to a metallic IC terminal). When an IC card is inserted, the card is locked. When a card having no IC terminal (such as a card having only a magnetic stripe) is inserted, the card is not locked.

Patent Document 1: Japanese Unexamined Patent Application Publication No. H02-126386
Patent Document 2: Japanese Unexamined Patent Application Publication No. H02-126385
Patent Document 3: Japanese Unexamined Patent Application Publication No. 2005-70870

DISCLOSURE OF THE INVENTION

Problems to Be Solved

However, in the case of the magnetic card reader disclosed in Patent Document 1 described above; the card reader has a structure in which a card provided with a magnetic stripe is not locked. Therefore, when a hybrid card, being in common use these days and having functions of both an IC card and a magnetic card, is inserted, the card is not locked so that the communication may be interrupted.

Also, in the case of the IC card processing devices disclosed in Patent Document 2 and Patent Document 3 described above, it is detected by using a metal sensor whether an IC terminal exists on the card or not. Therefore, the structure of each IC card processing device must be equipped with such a metal sensor. However, it is not easy to separately add a metal sensor afterward to an existing IC card processing device equipped with no metal sensor (Sometimes, due to the structure of the IC card processing device, it may be impossible to newly add a metal sensor).

Furthermore, when the detection is carried out only by a metal sensor, playful insertion of a metal plate for example makes the metal sensor mis-detect that it is an IC terminal. As a result, it may be misjudged that an IC card has been inserted.

Thus, the present invention may provide a medium processing device and a method of controlling the same with which an IC card locking mechanism can be materialized easily even without a metal sensor so as to eventually prevent the communication from interruption.

The present invention may provide the following aspects.

(1) A medium processing device; in which a card is inserted through an insertion slot, then the card is transferred so as to reach a back end (a card insertion complete position) of a card path while at least a part of a tail end of the card is exposed from the insertion slot, and thereafter processing operation for information to/from the card is carried out in response to manual performance of pulling out the card; the medium processing device including: a contact structure that comes into contact with a terminal of an integrated circuit mounted on the card; a detection means for detecting the card that has been inserted into a contact position where the terminal and the contact structure contact each other; a locking means for locking the card at the contact position; and a control means for controlling execution and cancellation of locking operation by the locking means; wherein the control means executes locking operation by the locking means as soon as the detection means detects insertion of the card, and afterwards when the card is not activated in response to an activation process for the integrated circuit, the locking operation by the locking means is canceled.

According to at least an embodiment of the present invention; the medium processing device, in which processing operation for information to/from the card is carried out in response to manual performance of pulling out the inserted card, includes a contact structure that comes into contact with a terminal of the card, a detection means for detecting the card that has been inserted into a predefined contact position, a locking means for locking the card at the contact position, and a control means for controlling execution and cancellation of locking operation. The control means executes locking operation as soon as the detection means detects insertion of the card. Afterwards when it is judged that the card is not activated, the locking operation is canceled. Therefore, an IC card locking function can easily be materialized.

In other words; as soon as the detection means detects insertion of the card, the locking operation is executed for the meantime. Afterwards when it is judged in checking the card activation that the card is not activated, the locking operation is canceled. Therefore, without installing any additional sensors, such as a metal sensor for detecting any presence of a terminal on a card, and a sensor for detecting any presence of a magnetic stripe, a locking function can be added. Accordingly, even with an existing medium processing device having no metal sensor (without modifying the hardware structure), a locking function for IC cards can be materialized easily, and eventually interruption of communication can be avoided.

Furthermore, the present invention may improve operability as well. More in details, presence of card activation is generally checked with presence of a normal ATR (Answer To Reset). Then, ATR operation completes in a comparatively short time (for example, several tens to hundreds of milliseconds) (Time of waiting for an ATR is short). Therefore, even when the card is once locked and then unlocked (for example, in the case of a magnetic card), the locking time is short enough so that pulling out the card can be done smoothly, and eventually operability can be improved.

(2) The medium processing device; wherein the medium processing device includes a magnetic data processing means that faces toward the card path and comes into contact with, and slides on a magnetic information recording section mounted on the card.

According to at least an embodiment of the present invention; the medium processing device includes a magnetic data processing means described above that faces toward the card path and comes into contact with, and slides on a magnetic information recording section mounted on the card. Therefore, if the ATR described above is not given, it is judged that the inserted card cannot be used as an IC card so that the card is immediately unlocked and magnetic information is read at the time of pulling out the card. Accordingly, even for users who are accustomed to using a magnetic card (a series of operations of inserting a card and pulling the card out instantly), a locking function can be materialized without asking any unusual operation.

(3) The medium processing device; wherein the locking means includes a solenoid and a locking lever operated by the solenoid, and the locking lever moves between a locking position for locking the card and an unlocking position for unlocking the card.

According to at least an embodiment of the present invention; the locking means described above includes a solenoid and a locking lever operated by the solenoid, and the locking lever moves between a locking position for locking the card and an unlocking position for unlocking the card. Therefore, the unlocking operation can be materialized quickly, eventually avoiding bringing any discomfort to users.

More specifically, in a case where the card is sunk and locked in the card path, a time interval from locking the card to unlocking it lasts long. Especially, those users who are accustomed to using a magnetic card, as described above, feel discomfort in such a case. However, by using a solenoid as a driving means for the locking operation and a locking lever as the locking mechanism according to the present invention, the unlocking operation can be materialized quickly, eventually avoiding bringing any discomfort to users.

(4) The medium processing device; wherein the detection means includes a moving member that moves in conjunction with insertion of the card, and a photo-sensor for intercepting incident light by movement of the moving member.

According to at least an embodiment of the present invention; the detection means described above includes a moving member that moves in conjunction with insertion of the card, and a photo-sensor for intercepting incident light by movement of the moving member. Therefore, the detection means can easily and correctly detect the card that has been inserted into the contact position.

(5) A method of controlling a medium processing device; in which a card is inserted through an insertion slot, then the card is transferred so as to reach a back end (a card insertion complete position) of a card path while at least a part of a tail end of the card is exposed from the insertion slot, and thereafter processing operation for information to/from the card is carried out in response to manual performance of pulling out the card; the medium processing device having a contact structure that comes into contact with a terminal of an integrated circuit mounted on the card; the method of controlling a medium processing device including: a detection step for detecting the card which has been inserted into a contact position where the terminal and the contact structure contact each other; a locking step for locking the card immediately when the detection step detects the card that has been inserted into the contact position; a judgment step for judging the type of the card that is objective for operation after the locking step; and an unlocking step for unlocking the card when the judgment step judges the card not to be an IC card.

According to at least an embodiment of the present invention; the method of controlling a medium processing device, having the contact structure described above, includes: a detection step for detecting the card which has been inserted into a contact position (a card insertion complete position), a locking step for locking the card immediately when the detection step detects the card that has been inserted into the contact position, a judgment step for judging the type of the card that is objective for operation, and an unlocking step for unlocking the card according to a judgment result by the judgment step. Therefore, without installing any additional sensors, a locking function for IC cards can be materialized easily, and eventually interruption of communication can be avoided.

(6) The method of controlling a medium processing device; wherein the judgment step judges that the card is an IC card if a response is given from the card for a command from a higher-level device, and contrarily judges that the card is not an IC card if no response is given from the card for the command from the higher-level device.

According to at least an embodiment of the present invention; the judgment step described above judges that the card is an IC card if a response is given from the card for a command from a higher-level device, and contrarily judges that the card is not an IC card if no response is given from the card for the command from the higher-level device. Therefore, through quick information exchange between the higher-level device and the medium processing device, the type of the card objective for operation can be judged.

(7) The method of controlling a medium processing device further including: an IC data processing step that carries out information processing for the integrated circuit when the card is judged to be an IC card; and a second unlocking step that unlocks the card as soon as the IC data processing step completes.

According to at least an embodiment of the present invention; the method of controlling a medium processing device includes: an IC data processing step that carries out information processing for the integrated circuit when the card is judged to be an IC card; and a second unlocking step that unlocks the card as soon as the IC data processing step completes. Therefore, a series of control steps; i.e., locking the IC card →IC data processing (data communication)→unlocking the IC card; can be quickly carried out.

Advantageous Effect of the Invention

According to the medium processing device and the method of controlling the same relating to the present invention, an IC card locking mechanism can be easily added even without a metal sensor so as to eventually prevent the communication from interruption.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

REFERENCE NUMERALS

1. Card reader
2. Locking lever
3. Solenoid
4. Detection switch
5. IC contact block
6. Card contact section
7. Contact
8. Card path
9. Card

DESCRIPTION OF THE PREFERRED EMBODIMENT

An embodiment of the present invention is described below with reference to the accompanying drawings. The present embodiment is described below by exemplifying a card reader 1 as a medium processing device, which carries out IC communication (Data communication) with a card. However, the present invention is not limited to the aspect of the embodiment.

Figure 1:
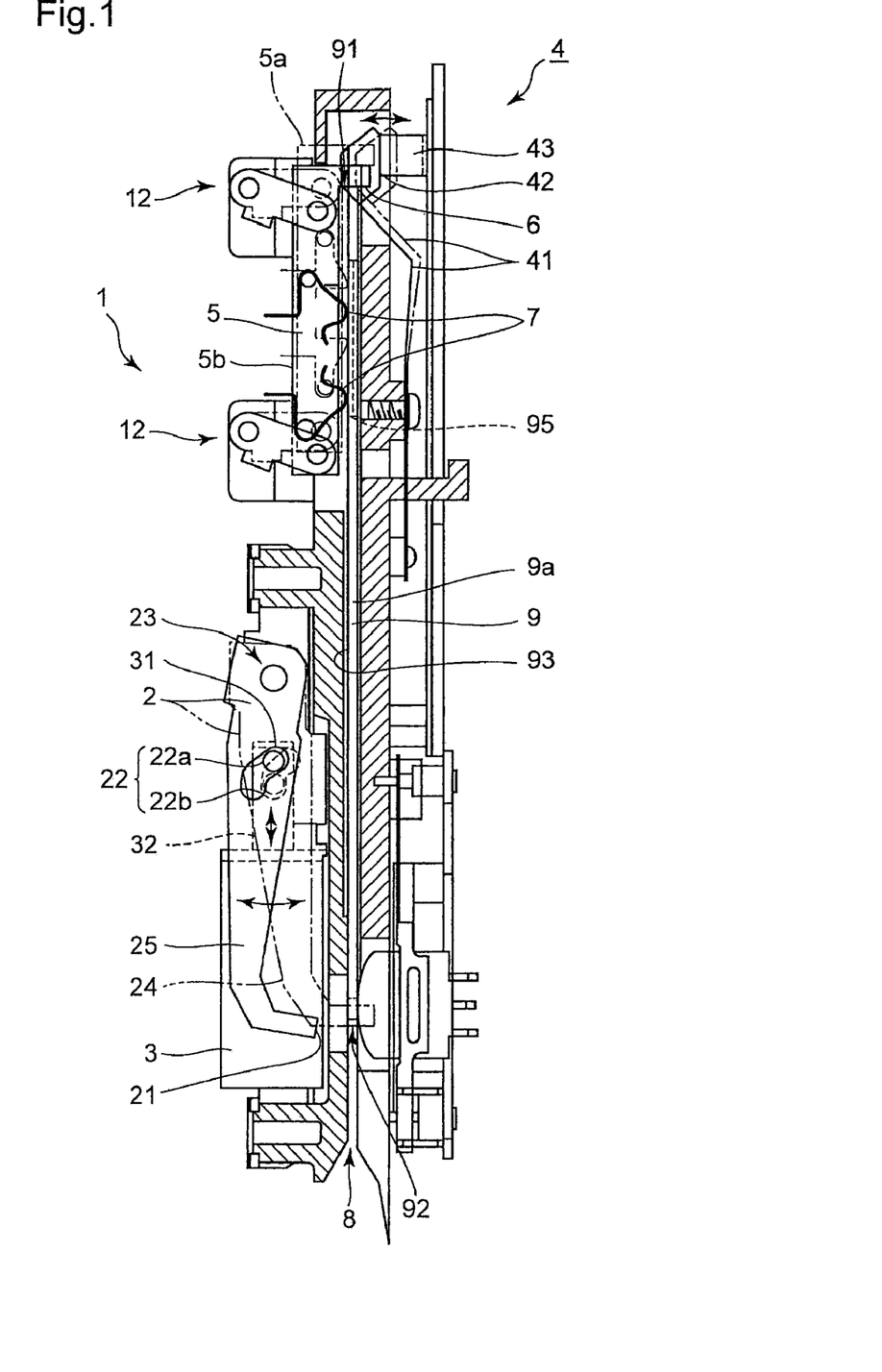
FIG. 1 is a sectional side view showing a mechanical structure of a card reader according to an embodiment of the present invention.
Figure 2:
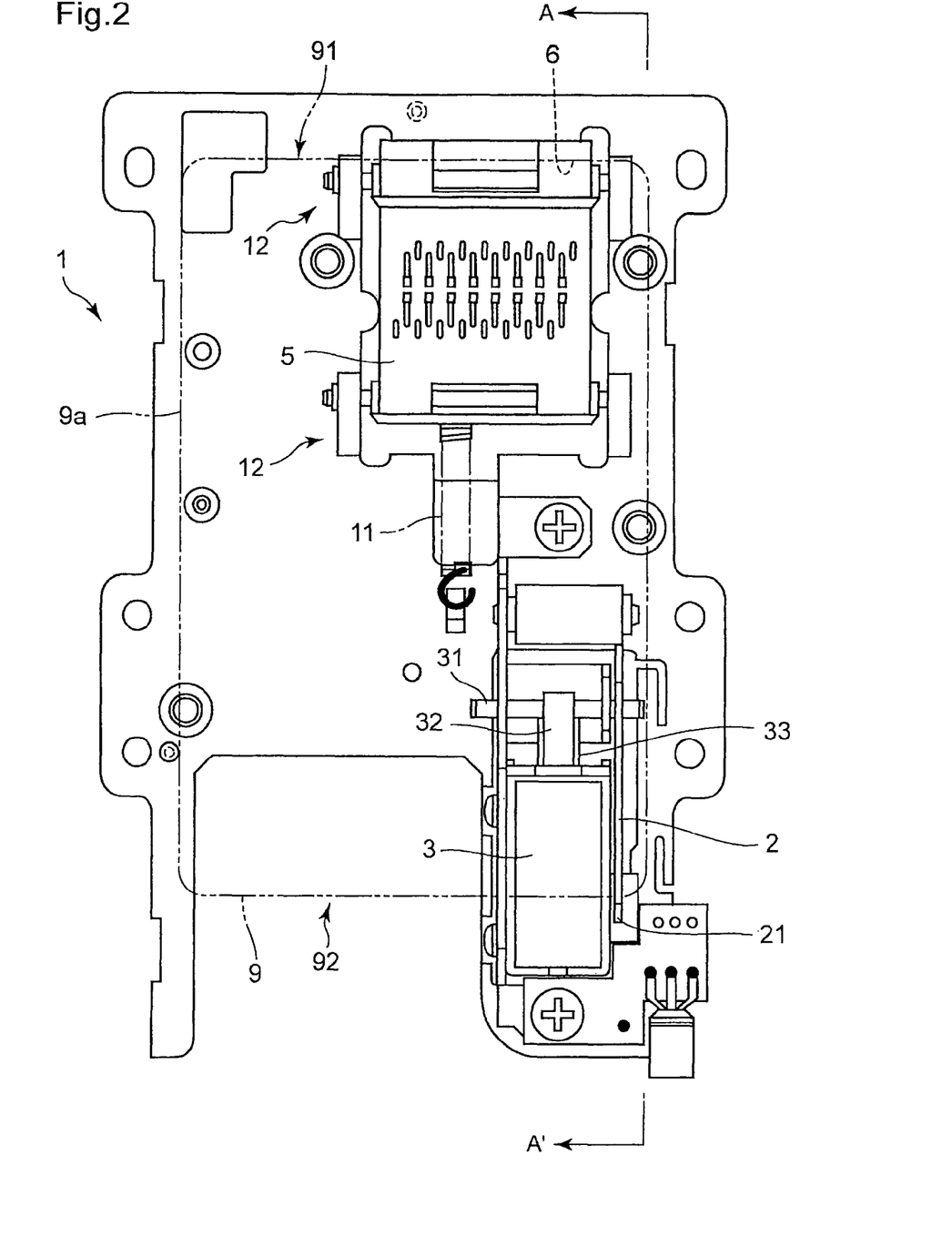
FIG. 2 is a sectional plan view showing a mechanical structure of the card reader according to the embodiment of the present invention.

FIG. 1 is a sectional side view showing a mechanical structure of the card reader 1 according to an embodiment of the present invention. Meanwhile, FIG. 2 is a sectional plan view showing a mechanical structure of the card reader 1 according to the embodiment of the present invention. Incidentally, FIG. 1 shows a view taken along the line A-A' in the sectional plan view of FIG. 2.

In the card reader 1 illustrated in FIG. 1 and FIG. 2, a card 9 is inserted through an insertion slot (an inlet of a card path 8). Then, the card 9 is transferred so as to reach a card insertion complete position (a back end) of the card path 8 (or simply called a "path") while at least a part of a tail end of the card 9 (a lower end of the card in FIG. 2) is exposed from the insertion slot (so as to enable a user to pull out the card by grasping the card 9). Thereafter, in response to manual performance of pulling out the card 9, processing operation for information (for example magnetic information) to/from the card is carried out.

In FIG. 1 and FIG. 2, the card reader 1 has a locking lever 2 that is operated by a solenoid 3. When the card 9 having been inserted is positioned at the card insertion complete position 9a (an example of "a contact position"), the card 9 is locked by a locking part 21 of the locking lever 2.

The locking lever 2 is so placed as to be able to move between a card locking position 24 and a card unlocking position 25 while changing its position. The locking lever 2 is so assembled into a frame of the card reader 1 as to be able to swing by using a supporting point 23 as a turning center. The locking lever 2 includes the locking part 21 that contacts a rear edge 92 of the card 9 to lock the card 9 and make it impossible to pull out the card 9.

The locking part 21 is so shaped as to catch the rear edge 92 of the card 9. Being postured at the card locking position 24, the locking part 21 blockades the card path 8 for locking the card 9 to prevent it from moving in a direction toward the rear edge 92. A top section of the locking part 21, which contacts an upper surface 93 of the card by sliding, is shaped to be rounded for example not to cause any damage onto the upper surface 93 of the card.

There exists an engaging hole 22 between the supporting point 23, which is a center of swinging of the locking lever 2, and the locking part 21. Intruded into the engaging hole 22 is an engaging pin 31 assembled to a tip of a plunger 32 of a solenoid 3 so as to make the locking lever 2 operated in conjunction with motion of the solenoid 3. The engaging hole 22 includes two parts; i.e., a moving hole 22a that is skewed in relation with an axis of the plunger 32, and a holding hole 22b that is almost parallel with the axis, wherein the two parts are so formed as to be smoothly continuous and bent halfway in their stretch. Then, the moving hole 22a is positioned closer toward a top edge 91 of the card than the holding hole 22b is, while being tilted toward the card path 8.

Therefore, when the plunger 32 is protrudent out of a main part of the solenoid 3, the engaging pin 31 is positioned at an end of the moving hole 22a and the locking lever 2 is postured at the card unlocking position 25 for pulling the locking part 21 out of the card path 8. When the plunger 32 is pulled back toward the main part of the solenoid 3 under the condition, the engaging pin 31 moves while contacting and sliding along an edge of the moving hole 22a to swing the locking lever 2 to the card locking position 24. Eventually, when the engaging pin 31 is positioned at the holding hole 22b, the locking lever 2 is held to be unable for swinging while being postured at the card locking position 24. To the contrary, when the plunger 32 moves in the protruding direction, the locking lever 2 is released from the card locking condition to swing to the card unlocking position 25.

Thus, the engaging hole 22 is formed so as to have a shape for guiding the locking lever 2 to an optimal position according to the motion of the solenoid. Through changing each stroke length of the moving hole 22a and the holding hole 22b as well as the skew angle of the moving hole 22a, the motion of the locking lever 2 can be changed arbitrarily.

The solenoid 3, which swings the locking lever 2 between the card locking position 24 and the card unlocking position 25 through reciprocating motion of the plunger 32, includes its main part fixed to the frame. At the tip of the plunger 32 that reciprocates in a straight line, the engaging pin 31 is assembled in a direction almost perpendicular to the axis direction of the plunger 32. Around the plunger 32, a returning coil spring 33 is positioned to push the plunger 32 in a direction for protruding plunger 32.

Therefore, the plunger 32 is protrudent owing to pushing force of the returning coil spring 33 when a coil of the solenoid 3 is not energized to be in an off state. Meanwhile, when the coil is in an on state to activate the solenoid 3, the plunger 32 is pulled back toward the main part of the solenoid 3 owing to an electromagnetic force.

Thus, in the present embodiment, activating the solenoid 3 to bring it into an on state can swing the locking lever 2 to the card locking position 24 and keep the locking lever 2 in the condition. Meanwhile, turning off the solenoid 3 to bring it into an off state can return the locking lever 2 to the card unlocking position 25.

In the present embodiment, the solenoid 3 and the locking lever 2 operated by the solenoid 3 as described above constitute "a locking means" for locking the card 9 at a card insertion complete position 9a. Meanwhile, as described above, the locking lever 2 moves between the card locking position 24, where the card 9 is locked, and the card unlocking position 25, where the card 9 is unlocked.

Furthermore, the card reader 1 shown in FIGS. 1 and 2 also has a detection switch 4 (an example of "a detection means") for detecting insertion of the card 9. The detection switch 4 is installed as a means for detecting the card 9 that has been inserted into the card reader 1, and operating the solenoid 3. Moreover, the detection switch 4 detects the card 9 that has arrived at the back end of the card path 8, i.e., the card insertion complete position 9a. In other words, the detection switch 4 detects the card 9 that has been inserted into a contact position where an IC terminal pattern 95 to be described later comes into contact with an IC contact block 5 (Namely, the contact position is the card insertion complete position 9a).

In the present embodiment, a combination of a sensor spring 41 and a photo-interrupter 43 is used as the detection switch 4. A part of the sensor spring 41 is positioned inside the card path 8, and therefore the sensor spring 41 bends down when the top edge 91 of the card 9 contacts the sensor spring 41. Meanwhile, a light-intercepting plate 42 is placed at a tip of the sensor spring 41 so that the light-intercepting plate 42 intercepts the light by cutting across the photo-interrupter 43 when the sensor spring 41 bends down.

Therefore, the detection switch 4 detects the card 9, which has been inserted, by light-interception. Namely, in the present embodiment, the detection switch 4 includes the light-intercepting plate 42 (an example of "a moving member") that moves in conjunction with insertion of the card 9, and the photo-interrupter 43 (an example of "a photo-sensor") at which the incident light is intercepted by movement of the light-intercepting plate 42. However, the detection switch 4 is not limited to a kind of photo-detector, and a micro-switch for example can be used instead.

The card reader 1 includes a card contact section 6 that the top edge 91 of the card 9 contacts, and a contact 7 that comes into contact with the IC terminal pattern 95 of the card 9 (a terminal of an integrated circuit mounted on the card 9); and further includes an IC contact block 5 (an example of "a contact structure") that moves obliquely along with the insertion of the card 9 so as to be positioned at a contact location 5a when the card insertion has completed.

As shown in FIG. 1, the IC contact block 5 is installed in the frame so as to move obliquely while keeping its posture in parallel with the card path 8 by using a parallel link mechanism 12. The frame is made of a steel plate or a basal plate for example; and in the frame, the IC contact block 5 is placed at a position that is displaced a little away from the center of the card 9 and somewhat close to a corner of card 9 (as shown in FIG. 2).

The parallel link mechanism 12 includes a couple of identically shaped links (See FIG. 1). When the parallel link mechanism 12 swings, the IC contact block 5 moves in parallel. In the present embodiment, the IC contact block 5 is so constructed as to move obliquely along a circular trajectory. Therefore, while moving in parallel and changing its distance from the card path 8, the IC contact block 5 can make the contact 7 come into contact with, or detached from the IC terminal pattern 95 of the card 9.

Since the IC contact block 5 is biased toward the rear edge 92 of the card by a biasing element 11, the IC contact block 5 stands by at a non-contact location 5b when the card 9 is not inserted. Furthermore, one side of the IC contact block 5 is equipped with the contact 7 that carries out IC communication (Data communication) while contacting the card 9. For example, copper wire is wound inside the IC contact block 5, and the side of one end of the wire is made to be swing-able while a bent part on the way to the end of the wire is protrudent from the side of the IC contact block 5 so as to come into contact with the IC terminal pattern 95 of the card 9.

Therefore, elasticity of the copper wire is utilized as pressing force of the contact 7 against the card 9. The contact 7 is so positioned as to face the IC terminal pattern 95 of the card 9 at the time when the top edge 91 of the card 9 contacts the card contact section 6 of the IC contact block 5. Subsequently, as the card 9 is further inserted, the IC contact block 5 moves in the direction toward the top edge 91 of the card 9 for the same distance as the card 9 is shifted for. Accordingly, facing the IC terminal pattern 95, the contact 7 comes close to and eventually comes into contact with the IC terminal pattern 95. In this instance, it is so disposed as that the contact 7 comes into contact with the IC terminal pattern 95 before the card 9 arrives at the card insertion complete position 9a.

The contact 7, which has already contacted the IC terminal pattern 95, further comes close to the card 9. At the time, the contact 7 comes into contact with the IC terminal pattern 95 by making use of elasticity of the contact 7 itself under condition of being pressed against the IC terminal pattern 95, and therefore the contacting condition of the two components is kept properly. For constructing the contact 7 that carries out communication with the card 9 under such a condition, it is preferable to use a material such as copper wire having properties of conductivity as well as elasticity.

Figure 3:
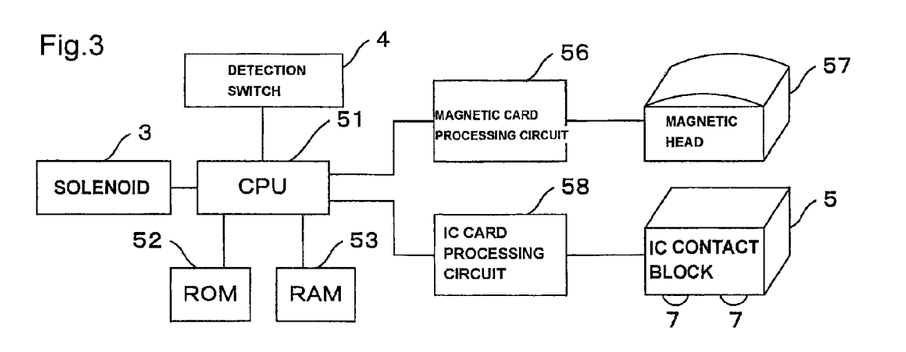
FIG. 3 is a block diagram showing an electrical structure of the card reader according to the embodiment of the present invention.

Incidentally, not shown in FIGS. 1 and 2 is a magnetic head 57 (an example of "a magnetic data processing means") that comes into contact with, and slides on a magnetic stripe when the magnetic stripe (an example of "a magnetic information recording section") is formed on the card 9 (The magnetic head 57 is illustrated in FIG. 3).

FIG. 3 is a block diagram showing an electrical structure of the card reader 1 according to the embodiment of the present invention.

In FIG. 3, the card reader 1 principally includes: a CPU 51 that controls the entire part of the device comprehensively, a ROM 52 that saves various programs and parameters, a RAM 53 that functions as a working area for the CPU 51, the solenoid 3 described above (Between the solenoid 3 and the CPU 51, there may exist a solenoid operation control circuit for operating the solenoid 3), the detection switch 4 described above, a magnetic card processing circuit 56, an IC card processing circuit 58, the magnetic head 57, and the IC contact block 5.

The magnetic card data processing circuit 56 processes I/O signals to/from the magnetic stripe of the card 9 by means of the magnetic head 57, and meanwhile the IC card processing circuit 58 processes I/O signals to/from the IC terminal pattern 95 of the card 9 by means of the IC contact block 5 (i.e., the contact 7 of the IC contact block 5). In particular, the IC card processing circuit 58 is usually equipped with a control IC, and it is controlled by the CPU 51 positioned on a main board.

Furthermore, the CPU 51 in cooperation with the ROM 52 and the RAM 53 controls the solenoid 3. Specifically, the control operation is as described above, and for example, it carries out control of pulling the plunger 32 back to the main part of the solenoid 3. Therefore, a group of components including the CPU 51, the ROM 52 and the RAM 53 functions as an example of "a control means" for controlling execution and cancellation of locking operation by the "locking means".

Incidentally, the CPU 51 and the IC card processing circuit 58 are placed on one and the same board in the present embodiment, but needless to add, they may be placed on different boards separately.

Figure 4:
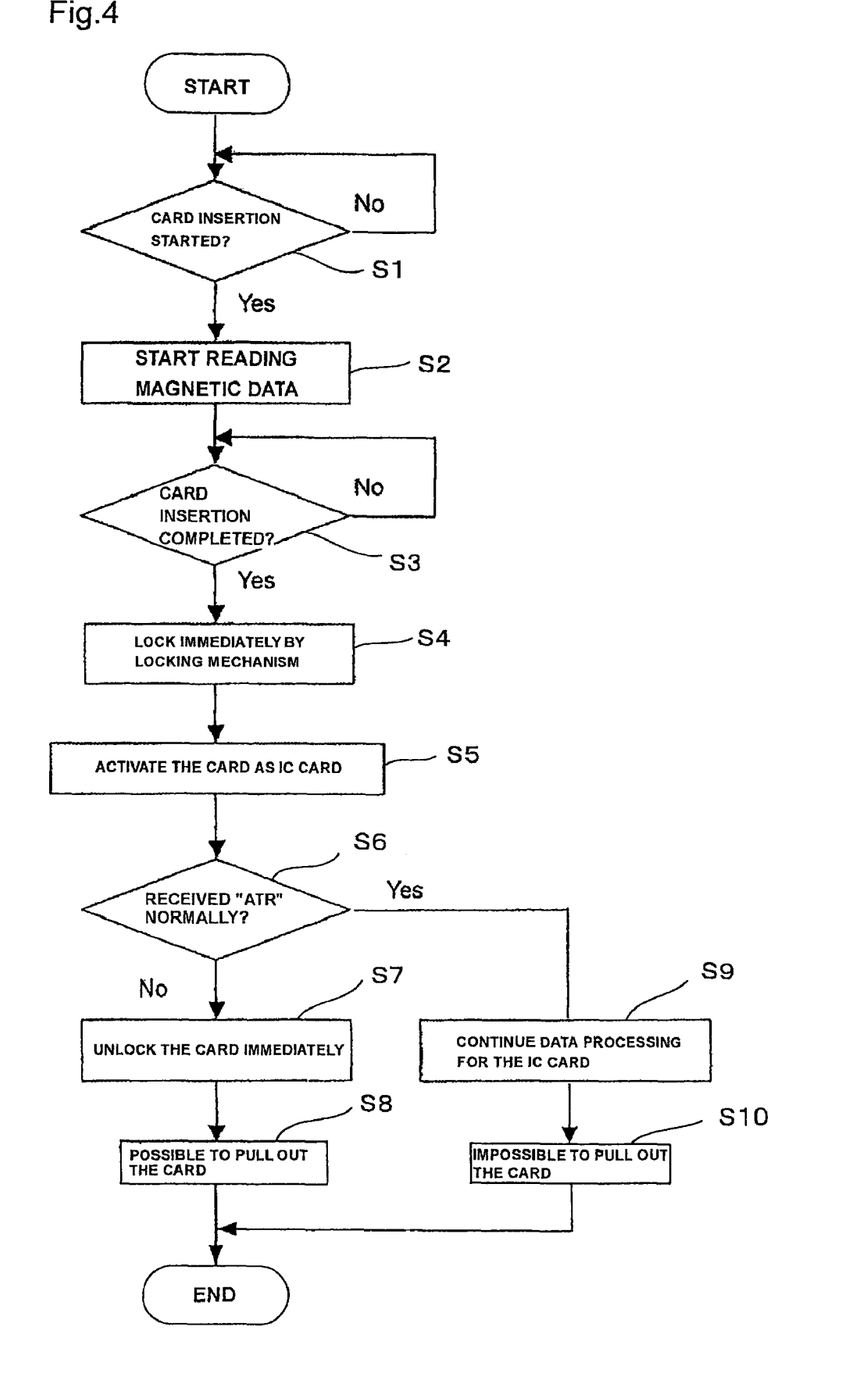
FIG. 4 is a flowchart showing a control method of the card reader according to the embodiment of the present invention.

FIG. 4 is a flowchart showing a control method of the card reader 1 according to the embodiment of the present invention.

In FIG. 4, the card reader 1 stands by for insertion of the card 9. Then, it is judged whether or not the insertion of the card 9 has already started (Step S1). It can be detected by the CPU51, for example with a magnetic head or a photo-sensor (not shown in the figure), whether or not the insertion of the card 9 into the card path 8 has started.

When the insertion of the card 9 is detected (Step S1:YES), reading magnetic data of the card 9 by the magnetic head 57 described above starts (Step S2). Contrarily, when no insertion of the card 9 is detected (Step S1: NO), the card reader 1 keeps standing by, as it is.

Subsequently, it is judged whether the insertion of the card 9 has completed (Step S3). Specifically to describe, receiving a detection signal from the detection switch 4 described above, the CPU51 judges whether the card 9 has arrived at the card insertion complete position 9a. Then, the process of Step S3 repeats until the card 9 arrives at the card insertion complete position 9a (as far as Step S3: NO is given).

When the card 9 has arrived at the back end of the card path 8, i.e., the card insertion complete position 9a (Step S3:YES), the locking mechanism immediately locks the card 9 (Step S4). Specifically to describe, the CPU51 shifts the locking lever 2 from the card unlocking position 25 to the card locking position 24 by controlling the solenoid 3 as soon as the detection switch 4 detects the insertion of the card 9. Thus, the locking operation completes to lock the card 9.

Subsequently, the card 9 is activated as an IC card (Step S5). Specifically to describe, the CPU51 tries an IC card activation process for the card 9. If the IC card activation process can be done, an ATR signal is normally received. Meanwhile, the IC card activation process cannot be done, it is impossible to normally receive the ATR signal. As a standby time for normally receiving the ATR signal, a predefined time is specified, for example to wait for several tens to hundreds of milliseconds.

When the ATR is not normally received as a result of Step S5 (Step S6: NO), the card 9 is immediately unlocked (Step S7). After unlocking the card 9, it becomes possible to pull out the card 9 (Step S8). At the time when the card 9 is pulled out, magnetic data is read, and then the series of operation steps completes. Thus, in the card reader 1 according to the present invention; when the card 9 does not get activated in response to the activation process for an integrated circuit of the card 9, the locking mechanism of the locking means is unlocked.

On the other hand, when the ATR is normally received in Step S6 (Step S6: YES), the card reader 1 recognizes the card 9 to be an IC card (or a hybrid card having both magnetic data and IC data). Then, the card reader 1 keeps on locking the card and continues the IC data processing (Data communication) (Step S9). Under the condition; even if it is subsequently tried, pulling out the card 9 cannot be carried out (Step S10). Afterwards the IC data processing completes and the series of operation steps completes.

As described above, the method of controlling the card reader 1 according to the present embodiment includes: a detection step for detecting the card 9 which has been inserted into the contact position (the card insertion complete position 9a) where the IC terminal pattern 95 and the IC contact block 5 contact each other (See Step S3 in FIG. 4), a locking step for locking the card 9 immediately when the detection step detects the card 9 that has been inserted into the contact position (See Step S4 in FIG. 4), a judgment step for judging the type of the card that is objective for the operation after the locking step (See Step S6 in FIG. 4), and an unlocking step for unlocking the card 9 (See Step S7 in FIG. 4) when the judgment step judges the card 9 not to be an IC card (See Step S6: NO in FIG. 4).

Among these operation steps, the judgment step (See Step S6 in FIG. 4) judges that the card 9 is an IC card if a response (ATR) is given from the card 9 in the IC card activation process. Contrarily, if no response (ATR) is given from the card 9 in the IC card activation process, the judgment step judges that the card 9 is not an IC card.

Moreover, the method of controlling the card reader 1 according to the present invention may include: an IC data processing step (not shown in FIG. 4) that carries out information processing for an integrated circuit of the card 9 when the card 9 is judged to be an IC card, and a second unlocking step (not shown in FIG. 4) that unlocks the card 9 at the same time as completion of the IC data processing step.

Advantageous Effect of the Embodiment

As described above; according to the card reader 1 and the method of controlling the same, a locking function can be materialized easily, and eventually interruption of communication can be avoided easily, even without any detector such as a metal sensor for example, for detecting presence of the IC terminal pattern 95 of the card 9 (or, without adding any change in the hardware structure).

Furthermore, since presence of card activation is judged by using an ATR signal (See Step S6 in FIG. 4), the card 9 can be quickly unlocked even after once being locked if the card is not an IC card, so that operability can be improved. Incidentally, regarding the operability, the solenoid 3 and the locking lever 2 are used as a locking means in the present embodiment, and therefore the locking and unlocking operations can be materialized quickly, eventually avoiding bringing any discomfort to users.

Mainly considered in the present embodiment is the card 9 that is a hybrid-type card having both magnetic data and IC data, but the card 9 may also be a memory card for example. In this case; a control application, in which the card is unlocked unless it is a predefined specific memory card, can be adopted. When the card 9 is a memory card, it is also taken into account that there exist some memory cards that do not have ATR signals. However, in such a case, it can be judged by checking some codes of a predefined area for example, whether the card is an objective one for the processing or not.

INDUSTRIAL APPLICABILITY

The medium processing device and the method of controlling the same according to the present invention are useful since they make it possible to easily materialize a locking function without any specific detector such as a metal sensor.

While the preferred embodiments of the present invention have been described using specific terms, such description is for illustrative purposes only, and it is to be understood that changes and variations may be made without departing from the spirit or scope of the appended claims.

What is claimed is:

1. A medium processing device for use with a card; in which the card is inserted through an insertion slot, then the card is transferred so as to reach a back end of a card path while at least a part of a tail end of the card is exposed from the insertion slot, and thereafter processing operation for information to/from the card is carried out in response to manual performance of pulling out the card; the medium processing device comprising:
   a contact structure that comes into contact with a terminal of an integrated circuit mounted on an IC card at a back end position of the card path;
   a detection means for detecting the card that has been inserted into the back end position where the terminal and the contact structure contact each other;
   a locking means for locking the card at the back end position; and
   a control means for controlling execution and cancellation of locking operation by the locking means;
   wherein the control means executes locking operation by the locking means as soon as the detection means detects insertion of the card that has been inserted into the back end position, and afterwards, in a state that the contact structure has come into contact with the card, an activation process in which the card is judged whether the card is an IC card or not is executed and, when the card is not activated in response to the activation process for the integrated circuit, the card is judged that the card is not an IC card and the locking operation by the locking means is canceled.

2. The medium processing device according to claim 1; wherein the medium processing device includes a magnetic data processing means that faces toward the card path and comes into contact with, and slides on a magnetic information recording section mounted on the card.

3. The medium processing device according to claim 2; wherein the locking means includes a solenoid and a locking lever operated by the solenoid, and the locking lever moves between a locking position for locking the card and an unlocking position for unlocking the card.

4. The medium processing device according to claim 2; wherein the detection means includes a moving member that moves in conjunction with insertion of the card, and a photo-sensor for intercepting incident light by movement of the moving member.

5. The medium processing device according to claim 1; wherein the locking means includes a solenoid and a locking lever operated by the solenoid, and the locking lever moves between a locking position for locking the card and an unlocking position for unlocking the card.

6. The medium processing device according to claim 5; wherein the detection means includes a moving member that moves in conjunction with insertion of the card, and a photo-sensor for intercepting incident light by movement of the moving member.

7. The medium processing device according to claim 1; wherein the detection means includes a moving member that moves in conjunction with insertion of the card, and a detection sensor for detecting the card that has been inserted into the back end position on a basis of movement of the moving member by the card.

8. A method of controlling a medium processing device; in which a card is inserted through an insertion slot, then the card is transferred so as to reach a back end position of a card path while at least a part of a tail end of the card is exposed from the insertion slot, and thereafter processing operation for information to/from the card is carried out in response to manual performance of pulling out the card; the medium processing device having a contact structure that comes into contact with a terminal of an integrated circuit mounted on an IC card; the method of controlling a medium processing device comprising:
   a detection step for detecting the card which has been inserted into the back end position;
   a locking step for locking the card immediately when the detection step detects the card that has been inserted into the back end position;
   a judgment step in which, after the locking step, in a state that the contact structure has come into contact with the card, an activation process in which the card is judged whether the card is an IC card or not is executed; and
   an unlocking step in which, when the card is not activated in the judgment step, the card is judged that the card is not an IC card and the locking operation by the locking means is cancelled.

9. The method of controlling a medium processing device according to claim 8;
   wherein the judgment step judges that the card is an IC card if a response is given from the card for a command from a higher-level device, and contrarily judges that the card is not an IC card if no response is given from the card for the command from the higher-level device.

10. The method of controlling a medium processing device according to claim 9, further comprising:
    an IC data processing step that carries out information processing for the integrated circuit when the card is judged to be an IC card; and
    a second unlocking step that unlocks the card as soon as the IC data processing step completes.

11. The method of controlling a medium processing device according to claim 8, further comprising:
    an IC data processing step that carries out information processing for the integrated circuit when the card is judged to be an IC card; and
    a second unlocking step that unlocks the card as soon as the IC data processing step completes.

12. The method of controlling a medium processing device according to claim 8, wherein the judgment step judges that the card is an IC card when an ATR is normally received from the card, and contrarily judges that the card is not an IC card when an ATR is not received from the card.

* * * * *